US012545115B2

(12) United States Patent
Lo Calzo et al.

(10) Patent No.: US 12,545,115 B2
(45) Date of Patent: Feb. 10, 2026

(54) ELECTRICAL SYSTEM OF A ROAD VEHICLE PROVIDED WITH A DC-DC ELECTRONIC POWER CONVERTER AND RELATED ROAD VEHICLE

(71) Applicant: FERRARI S.P.A., Modena (IT)

(72) Inventors: Giovanni Lo Calzo, Modena (IT); Ugo Sitta, Modena (IT); Roberto Betro', Modena (IT); Giuseppe Agnello, Modena (IT); Lorenzo Di Nardo, Modena (IT); Luca Poggio, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/342,257

(22) Filed: Jun. 27, 2023

(65) Prior Publication Data
US 2024/0001767 A1 Jan. 4, 2024

(51) Int. Cl.
*B60L 1/00* (2006.01)
*B60L 3/00* (2019.01)
(Continued)

(52) U.S. Cl.
CPC ............. *B60L 3/04* (2013.01); *B60L 1/00* (2013.01); *B60L 3/0046* (2013.01); *B60L 50/60* (2019.02);
(Continued)

(58) Field of Classification Search
CPC ....... H02H 7/268; B60L 3/0092; B60L 58/20; B60L 3/0023; B60L 58/10; B60L 2210/10; H02J 2310/48; B60R 16/03
(Continued)

(56) References Cited

U.S. PATENT DOCUMENTS

| 2010/0065351 A1* | 3/2010 | Ichikawa ................ B60L 58/15 |
| | | 903/930 |
| 2020/0324659 A1* | 10/2020 | Lo Calzo ................ B60L 58/13 |

(Continued)

FOREIGN PATENT DOCUMENTS

EP          2573927 A1 *   3/2013   .......... B60L 11/1803

OTHER PUBLICATIONS

Italian Search Report for Application No. 102022000013954; Filing Date: Jul. 1, 2022; Date of Mailing—Jan. 24, 2023, 9 pages.

*Primary Examiner* — Elim Ortiz
(74) *Attorney, Agent, or Firm* — CANTOR COLBURN LLP

(57) ABSTRACT

Electrical system of a road vehicle comprising a high-voltage electric circuit provided with a first power storage system and a low-voltage electric circuit provided with a second power storage system and with a plurality of electrical loads; an electronic DC-DC power management and conversion system, which connects the low-voltage electric circuit and the high-voltage electric circuit to each other so as to selectively transfer electrical energy from the high-voltage electric circuit to the low-voltage electric circuit and/or vice versa; the electronic system comprises a control unit configured to detect a malfunction of the first storage system and/or of the second storage system and/or of at least one of the electrical loads and to control, depending on the malfunction, a conversion device and a distribution unit in order to ensure the supply of power to at least some priority loads among the electrical loads.

13 Claims, 13 Drawing Sheets

(51) Int. Cl.
    *B60L 3/04*     (2006.01)
    *B60L 50/60*    (2019.01)
    *H02H 7/20*     (2006.01)
    *B60W 50/029*   (2012.01)
(52) U.S. Cl.
    CPC ............ *H02H 7/20* (2013.01); *B60L 2210/12* (2013.01); *B60L 2210/14* (2013.01); *B60W 50/029* (2013.01)
(58) Field of Classification Search
    USPC ............ 180/65.8; 307/9.1, 10.1; 318/400.22, 318/400.3
    See application file for complete search history.

(56) References Cited

U.S. PATENT DOCUMENTS

| | | | |
|---|---|---|---|
| 2020/0343763 A1 | 10/2020 | Wataru | |
| 2022/0091193 A1* | 3/2022 | Kwon | G01R 31/54 |
| 2022/0102966 A1* | 3/2022 | Tan | H02H 1/0007 |

\* cited by examiner

ELECTRICAL SYSTEM OF A ROAD VEHICLE PROVIDED WITH A DC-DC ELECTRONIC POWER CONVERTER AND RELATED ROAD VEHICLE

CROSS-REFERENCE TO RELATED APPLICATIONS

This patent application claims priority from Italian patent application no. 102022000013954 filed on Jul. 1, 2022, the entire disclosure of which is incorporated herein by reference.

TECHNICAL FIELD

The invention relates to an electrical system of a road vehicle provided with a DC-DC electronic power converter and to a corresponding road vehicle.

In particular, the invention can advantageously, though not exclusively be applied to a high-performance electric (or hybrid) road vehicle, to which explicit reference will be made in the description below without because of this losing in generality.

BACKGROUND OF THE INVENTION

Hybrid or electric vehicles are known, which are provided with at least one electric machine, which is electrically connected to a power storage system, namely a battery pack, and is mechanically connected to the drive wheels in order to transmit a torque to them.

The electrical system of a hybrid or electric vehicle usually comprises an electric circuit with a high voltage (in relative terms, it could also have a nominal voltage of mere 48 Volts) and a high power, to which the electric machine is connected; the high-voltage electric circuit comprises a storage device (provided with at least one pack of electrochemical batteries, for instance lithium ion or polymer batteries) and a bidirectional DC-AC electronic power converter, which, on the direct current side, is connected to the storage device and, on the alternating current side, is connected to the electric machine and fulfils the function of controlling the electric machine.

The electrical system of these vehicles further comprises an electric circuit with a low voltage (generally having a nominal voltage of 12 Volts) and a low power, to which all auxiliary electric services (for instance, the control units of all vehicle sub-systems, the infotainment system, the anti-theft system, the passenger compartment lighting system, the outer lights, the electric starter motor of the heat engine in case of hybrid vehicles, etc.) are connected. In hybrid vehicles, the low-voltage electric circuit is provided with a storage device of its own (provided with one single electric battery, which is relatively heavy and large-sized) having a high inrush current (power) needed to supply (for a few seconds) the electric starter motor of the heat engine. Furthermore, in general, a DC-DC electronic power converter is provided, which connects the low-voltage electric circuit and the high-voltage electric circuit to one another so as to transfer electrical energy from one to the other; namely, the electrical energy provided by the high-voltage electric circuit is used both to charge the storage device of the low-voltage electric circuit and to power the electrical loads of the low-voltage electric circuit.

In high-performance vehicles, weight and dimensions always need to be reduced, in order to maximize the performances of the vehicle, for example when racing on a track.

In hybrid vehicles, in order to try and reduce the weight and the size of the low-voltage electric circuit, the storage device of the low-voltage electric circuit can be eliminated and the electrical power that can be delivered by the DC-DC electronic power converter can be increased; however, with this design solution, the total weight saved turns out to be modest (while the total manufacturing costs significantly increase), as the nominal power of the DC-DC electronic power converter must increase from approximately 2 kW (needed to power all the electrical loads during the normal running of the vehicle) to more than 10 kW (needed by the electric starter motor during the few instants in which it initiates the engine's operation).

In entirely electric vehicle, the presence of a low-voltage storage device is not, theoretically speaking, so necessary; however, when the storage device of the low-voltage electric circuit is eliminated, the DC-DC electronic power converter needs to always remain active, even when the vehicle is parked, so as to supply the necessary power to the electrical loads that always need to be powered (typically, the anti-theft system, which is always active when the vehicle is parked, and the infotainment system, which could dialogue with the owner of the vehicle from a distance or with a remote assistance centre when the vehicle is parked). As a consequence, the DC-DC electronic power converter is continuously stressed (namely, it needs to work 24/7) and, hence, it requires a more expensive designing in order to be able to stand continuously operating for an adequately long amount of time (taking into account the fact that the minimum life of a vehicle is at least ten years).

In addition, the continuous addition of vehicle loads, which are becoming more and more relevant from a safety point of view, led to the installation of dedicated control units for each type of load and, hence, to the creation of distributed architectures with different control units/circuits placed in the area of the loads, thus realizing complex power supply systems (in some cases to be to certified) to ensure the reliability of the whole electrical system. For example, local rack-mount converters and disconnectors (for example, power guardians) are currently used.

Finally, especially for electric vehicles, a possible fault of the main storage system (namely, of the high-voltage storage system according to the indications above) or to one of the loads or of the switches could determine unacceptable risks for the safety of the driver, of the vehicle or of those standing nearby the vehicle, since situation can occur, in which a load is completely left out of the power supply or in which a fault, for example a short-circuit, spreads to several loads. In order to avoid this, the only known solution is the creation of complex, expensive, redundant, distributed structures, for example in which each control unit is provided with a local storage system, with a significant increase in costs and in the complexity of the wiring of the road vehicle.

Patent US2022091193A1 discloses a control device for the power supply of an autonomous vehicle configured for diagnosing an open-circuit fault.

Said patent discloses a power distribution system, which comprises a main power supply line, sub-lines coupled to the main power supply line and a controller.

DESCRIPTION OF THE INVENTION

The object of the invention is to provide an electrical system of a road vehicle provided with a DC-DC electronic power converter and a relative road vehicle, which are not at least partially affected by the drawbacks described above and, at the same time, are easy and economic to be manufactured.

According to the invention, there are provided an electrical system of a road vehicle provided with a DC-DC electronic power converter and a relative road vehicle as claimed in the independent claims attached hereto and, preferably, in any one of the dependent claims directly or indirectly depending on the independent claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein.

DETAILED DESCRIPTION

Figure 1:
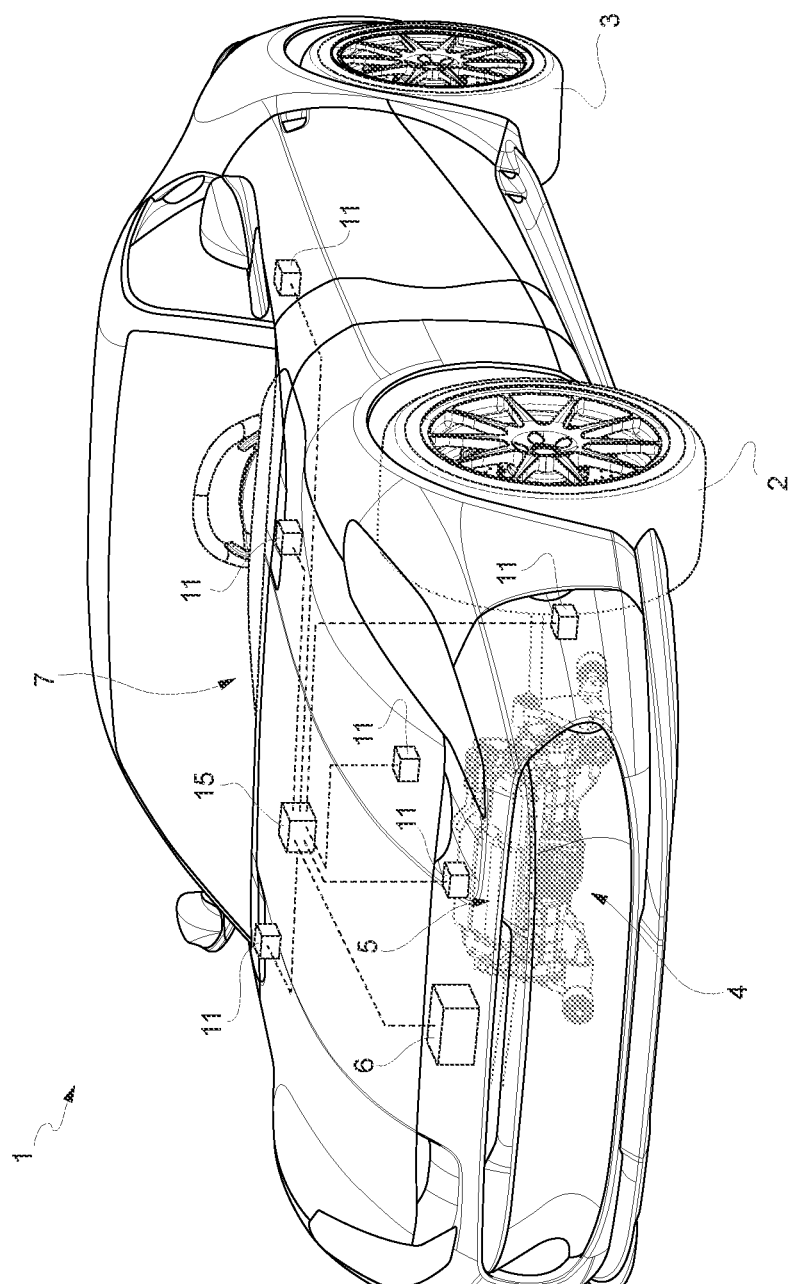
FIG. 1 is a schematic perspective view, with details left out for greater clarity, of a road vehicle according to an embodiment of the invention.

In FIG. 1, number 1 generically indicates, as a whole, a road vehicle provided with two front wheels 2 and two rear wheels 3, at least a pair (or all) of them receiving the torque from an electric or hybrid powertrain system 4. The powertrain system 4 can be exclusively electric (namely, only comprising one or more electric motors) or hybrid (namely, comprising an internal combustion heat engine and at least one electric motor).

In the figures, the same numbers and the same reference letters indicate the same elements or components with the same function.

For the purposes of the invention, the term "second" component does not imply the presence of a "first" component. As a matter of fact, these terms are only used as labels to improve clarity and should not be interpreted in a limiting manner.

The elements and features contained in the different preferred embodiments, drawings included, can be combined with one another, without for this reason going beyond the scope of protection of this patent application, as described hereinafter.

The powertrain system 4 preferably comprises at least one electric machine 5, which is controlled by an AC/DC electronic power converter (namely, an "inverter") (of the known kind and not shown herein), which is connected to a first power storage system 6 provided with chemical batteries.

Preferably, though not necessarily, the DC-AC electronic power converter is a bidirectional power converter and comprises a direct current side, which is connected to the first storage system 6, and a three-phase alternating current side, which is connected to the electric machine 5.

Furthermore, the road vehicle 1 comprises an electrical system 7, which comprises a high-voltage HV electric circuit 8 (in relative terms), for example, not in a limiting manner, having a nominal voltage of 800 or 400 or 48 Volts, and a low-voltage LV electric circuit 9, for example having a nominal voltage of 12 Volts.

It should be pointed out that the electric circuit 8 is defined "high-voltage" circuit because it has a nominal voltage (800 V, 400 V, 48 V) which is greater than the nominal voltage (12 V) of the electric circuit 9, namely the definition "high voltage" should be interpreted as concerning the sole electrical system 7 and with reference to the electric circuit 19 having a nominal voltage of 12 Volts.

In some non-limiting cases, the high-voltage HV electric circuit 8 comprises the first storage system 6 and the AC/DC electronic power converter, which, on one side, is connected to the first storage system 6 and, on the opposite side, is connected to the electric machine 5 (namely, to the stator windings of the electric machine 5). For the sake of simplicity, in the accompanying figures, the high-voltage HV electric circuit 8 only comprises at least the first storage system 6.

According to some preferred non-limiting embodiments, the low-voltage LV electric circuit 9 comprises a second storage system 10 (which obviously has the same voltage as the electric circuit 9) and a plurality of electrical loads 11, each designed to only absorb electrical energy for its own operation (namely, none of these electrical loads are capable of generating electrical energy).

The second storage system 10 has a smaller voltage than the first storage system 6.

In particular, the electrical loads 11 comprise (high-priority) continuous electrical loads 12, which have a modest absorption of power and must constantly be supplied with power regardless of the use of the road vehicle 1 (namely, for example, they must constantly be supplied with power even when the road vehicle 1 is parked), and (priority 13 or non-priority 14) occasional electrical loads 13, 14, which must be supplied with power only when the road vehicle 1 is being used and, in some cases, only for limited amounts of time.

Advantageously, though not necessarily, the continuous electrical loads 12 comprise, for example, an alarm system and an infotainment system; however, further continuous electrical loads other than the ones mentioned above can obviously be provided, such as, for example, electronic control units which, in case of interruption of the supply of power, generate, when they are re-started, an error message (namely, those electronic control units which, despite being capable of operating in standby and low-energy mode, always need to be powered with continuity or otherwise generate errors when they are re-started).

On the other hand, preferably, though not in a limiting manner, the priority electrical loads 13 are those loads whose malfunction M could lead to an unacceptable risk for the driver, for the vehicle 1 or for people near the vehicle 1, hence, for instance, control units used for the powertrain system 4, such as inverters and/or BMS and/or steer by wire, active suspensions, etcetera. In other words, the priority electrical loads 13 are any kind of load that can jeopardize the performances or the safety of the road vehicle 1.

For example, the malfunction M is detected by monitoring the supply of power by the storage systems 6 and 10 and can consist of a short-circuit, an overload, open loads, etcetera.

In particular, on the other hand and not in a limiting manner, the non-priority electrical loads 14 comprise, for instance, a passenger compartment lighting system, the outer lights, an air conditioning system (not shown), the different control units of these systems, the activation of the windows, the radio set, the navigation system. In other words, the non-priority electrical loads 14 comprise everything that concerns the driver's comfort or can be deemed optional. Obviously, further non-priority electrical loads 13 other than the ones mentioned above can be provided.

Advantageously, the electrical system 7 comprises at least one electronic DC-DC power management and conversion system 15, which connects the low-voltage LV electric circuit 9 and the high-voltage HV electric circuit 8 to one another in order to selectively transfer electrical energy from the high-voltage HV electric circuit 8 to the low-voltage LV electric circuit 9 and/or vice versa.

In particular, the electronic management and conversion system 15 is configured to keep the loads 11 (in particular, at least the priority loads 13) alive, namely powered, in the absence of one of the storage systems 6 or 10. In other words, in case of a malfunction M of the first storage system 6 or of the second storage system 10 (FIGS. 3 and 4), the electronic management and conversion system 15 powers the loads 11 (in particular, at least the priority loads 13) by conveying power from the second storage system 10 or from the first storage system 6, respectively.

Figure 2:
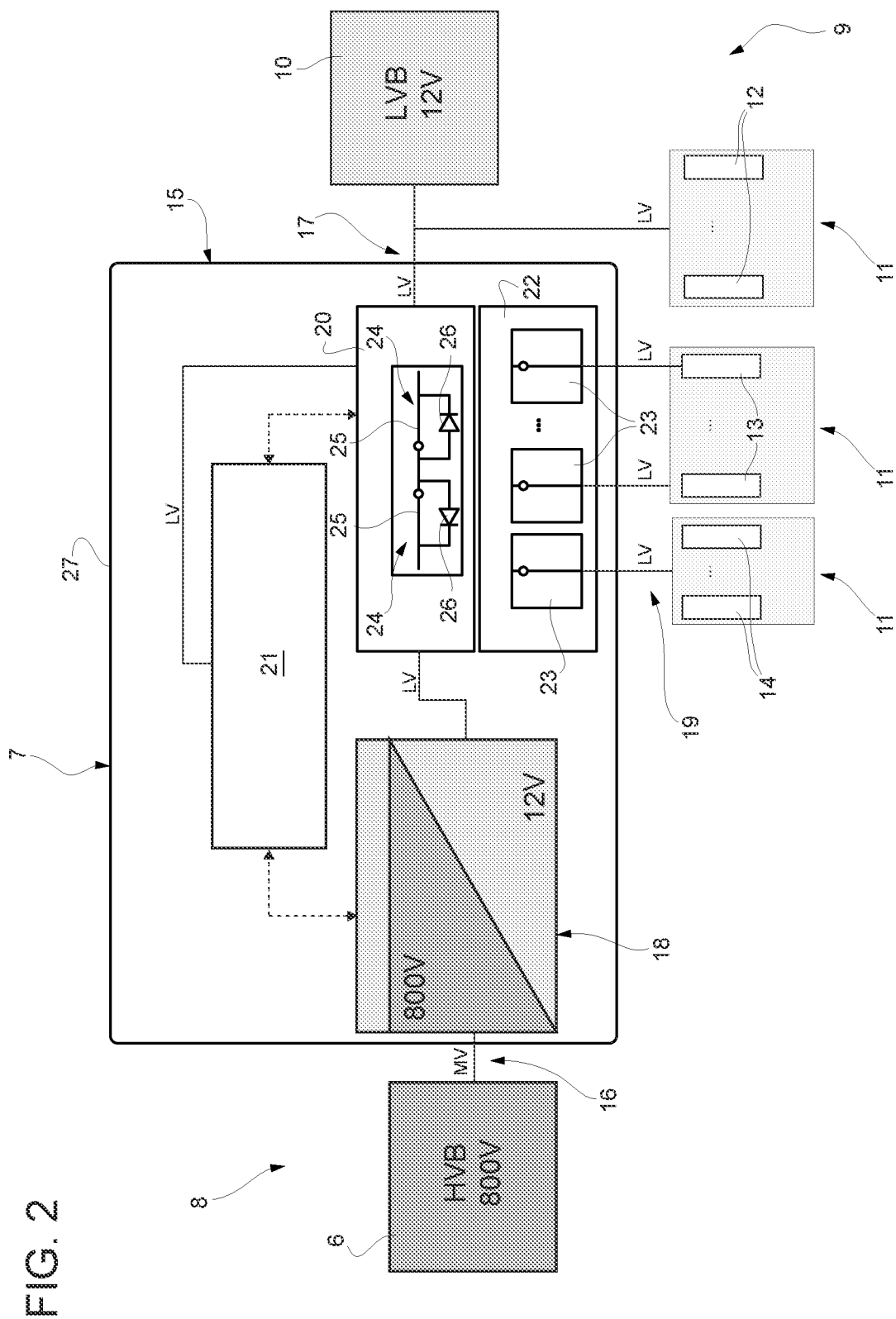
FIG. 2 is a schematic view of a first embodiment of the electrical system of the road vehicle of FIG. 1, which is manufactured according to the invention and is in an operating configuration.

According to the non-limiting embodiment of FIG. 2, the electronic management and conversion system 15 comprises a high-voltage HV input/output 16 connected to the first storage system 6 and a low-voltage LV input/output 17 connected to the second 10 storage system.

In particular, not in a limiting manner, the electronic management and conversion system 15 is distinct and separate from the storage systems 6 and 10. In other words, they are not located in the same position and are not integrated in one single casing.

Advantageously, the electronic management and conversion system 15 comprises at least one conversion device 18, which is capable of varying the direct electric voltage (for example, from 800 V to 12 V and vice versa, or from 400 V to 12 V and vice versa, or from 48 V to 12 V and vice versa, or from 800 V to 48 V and vice versa, etc.) and is interposed between the high-voltage HV input/output 16 and the low-voltage input/output 17.

The electronic management and conversion system 15 further comprises, as shown, for example, in the non-limiting embodiment of FIG. 2, a low-voltage LV output 19 (namely, having a nominal tension of less than 48 V, for instance 12 V), which is connected to the electrical loads 11 of the low-voltage electric circuit 9.

Advantageously and as shown in the non-limiting embodiments of the accompanying figures, the electronic management and conversion system 15 further comprises a distribution unit 20 (for example, a power mux) interposed between the conversion device 18 (namely, a power converter) and the low-voltage input/output 17 and configured to power the electrical loads 11 of the road vehicle 1 selectively through the energy coming from the first storage system 6 or from the second storage system 10. In particular, in nominal work conditions, the electrical loads 11 are powered by the second low-voltage storage system 10.

Finally, the electronic management and conversion system 15 comprises, on the inside, a control unit 21 configured to control the conversion device 18 and the distribution unit 20.

In particular, the control unit 21 is configured to detect a malfunction M of the first storage system 6 and/or of the second storage system 10 and/or of at least one of the electrical loads 11 and to control, depending on the detected malfunction M, the conversion device 18 and the distribution unit 20 so as to ensure the supply of power to at least some priority loads 13 among the electrical loads 11.

Advantageously, though not in a limiting manner, the control unit 21 is provided with a memory and with a microprocessor (of the known kind and, therefore, not described in detail), monitors the operation of the electronic DC-DC management and conversion system 15 and activates (operates) the conversion device/s 18 as well as receives information on possible malfunctions of the storage systems 6 and 10 and of the electrical loads 11.

Preferably, though not in a limiting manner, the control unit 21 dialogues with the other control units of the road vehicle 1 through a local network (for example using the CAN or Ethernet protocol). In detail, the control unit 21 is directly powered by the low-voltage LV input/output 17 and, hence, also by the second storage system 10; alternatively (or in addition), the control unit 21 can directly be powered by the high-voltage HV input/output 16 and, hence, is directly powered by the first storage system 6 and/or by the electric machine 5.

According to a preferred, though non-limiting embodiment, the electrical system 7 further comprises a selection unit 22, which is interposed between the electrical loads 11 and the distribution unit 20 and is configured to selectively connect or disconnect certain loads 11 according to the commands given by the control unit 21. In particular, the selection unit 22 comprises a plurality of disconnecting devices 23, for instance relays, fuses or switches, which only have a disconnecting function, namely the function of interrupting the "metal" continuity of the power supply coming from the distribution unit 20. In other words, while the distribution unit 20 permits the selection between the first storage system 6 and the second storage system 10, the (normally closed) disconnecting devices 23 are each connected to a respective load 11 and are configured to cut the supply of power to said load 11 (namely, to open) in case the control unit 21 detects a malfunction M and, by means of inner logics of its, defines said load 11 as a non-priority load 14.

In the non-limiting embodiments of the accompanying figures, the distribution unit 20 comprises two selectors 24 (for example, comprising a switch 25 and a safety diode 26), each determining the connection or lack thereof of the loads 11 to the conversion device 18 (namely, to the first storage system 6) and/or to the second storage system 10.

Advantageously, though not necessarily, if the malfunction M is related to one of the electrical loads 11, the control unit 21 is configured to control the selection unit 22 so as to disconnect the malfunctioning electrical load 11 from the rest of the electrical system 7.

In particular, the electrical system 7, more precisely the selection unit 22, is provided with at least one disconnecting device 23 for the priority electrical loads 13 and with a disconnecting device 23 for the non-priority electrical loads 14.

In the non-limiting embodiments of the accompanying figures, the continuous electrical loads 12 are directly connected to the low-voltage electric circuit 9, in particular on the outside of the electronic management and conversion system 15.

In other non-limiting cases, which are not shown herein, the continuous electrical loads 12 are connected, like the loads 12 and 13, to a respective disconnecting device 23 (or to the same disconnecting device 23 as the priority loads 13); hence, in particular, the continuous electrical loads 12 are connected to the electronic management and conversion system 15.

Advantageously, though not necessarily, and as shown in the non-limiting embodiments of FIGS. 3, 4, 7, 8, 11 and 12, the control unit 21 is configured to disconnect the first storage system 6 or the second storage system 10 from the electrical loads 11, if the malfunction M (indicated with X in the aforesaid figures) is related to the first storage system 6 or to the second storage system 10, respectively, anyway while always supplying power at least to the priority loads 13 and disconnecting one or more of the non-priority loads 14.

As mentioned above, the non-priority loads 14 are those electrical loads 11 concerning comfort and/or deemed optional, whereas the priority loads 13 are those electrical loads 11 concerning safety and/or the performances of the road vehicle 1.

In some non-limiting cases, part of the loads 11 concerning the performances of the road vehicle 1, depending on the malfunction M, for example in case of a problem of the first storage system 6, is considered as non-priority load 14 and, hence, disconnected from the control unit 21. In this way, the road vehicle 1 can still be used, even though to a degraded extent, even in case of serious malfunctions M, ensuring the safety of the driver and of the vehicle 1.

Advantageously, though not necessarily, the electronic management and conversion system 15 is scalable and/or redundant, namely it comprises at least two conversion devices 18, which are connected to one another in parallel both at the high-voltage input/output 16 and at the distribution unit 20 (namely, at the respective connection to the low-voltage circuit 9). In this way, by providing n power converters, n power supply lines for the electrical loads 11 are defined, which can centrally be disconnected by the control unit 21 by means of the selection unit 22, so as to create redundancies to respect possible liability or safety limitations.

According to some preferred non-limiting embodiments, the control unit 21 is configured, in particular when the road vehicle 1 is used (namely, when it is moving in a more or less continuous manner), to estimate an electrical power requested by the electrical loads 11 and decides how many conversion devices 18 to operate together depending on the electrical power requested by the electrical loads 11.

Advantageously, though not necessarily, according to what disclosed so far, the second storage system 10 is sized so as to be able to autonomously power (namely, without the aid of the storage system 6) at least the non-priority loads 13.

In some preferred non-limiting cases, the conversion device 18 (or each one of them, if there are more than one) is a bidirectional device, namely it selectively operates as a power buck (buck mode) or as a power boost (boost mode) (hence, changing the direction of the power flow from or to the high-voltage circuit 8). For example, not in a limiting manner, the device 18 could be used as a power boost in case of presence of a system to maintain the high voltage HV when the road vehicle 1 is parked.

According to some preferred non-limiting embodiments, the electronic management and conversion system comprises one single outer protective enclosure 27 (made of metal or plastic) internally housing at least the conversion device 18, the control unit 21 and the distribution unit 20, preferably also the selection unit 22. In this way, the logic and power management of the system 7 is centralized, thus avoiding the need for dislocated and locally powered systems and ensuring the redundancy needed for the requested vehicle safety.

In the non-limiting embodiments of FIGS. 10 to 13, the electrical system 7 comprises a pair of management and conversion systems 15 in parallel to one another, at least one of them (shown at the top in FIGS. 10 to 13) being connected both to the first storage system 6 and to the second storage system 10. On the other hand, the other system 15, namely the one shown at the bottom, is exclusively connected to the first storage system 6. In other non-limiting cases, which are not shown herein, the other system 15, namely the one shown at the bottom, is also connected to both storage systems 6 and 10. In particular, in these embodiments, the priority loads 13 are powered by both systems 15, so as to ensure the useful redundancy in terms of safety, in case there is a malfunction M of one of the conversion devices 18.

In some non-limiting cases, like the ones shown in the embodiments of FIGS. 6 to 9, the electrical system 7 further comprises a medium-voltage MV circuit 28 (namely, always in relative terms, with a voltage that is greater than the low voltage LV and smaller than the high voltage).

In particular, the electronic management and conversion system 15 comprises, like in the previous cases, the high-voltage input/output 16, the low-voltage LV input/output 17 and the low-voltage LV output 19 connected to the low-voltage electrical loads 11. Preferably, though not in a limiting manner, in addition, the electronic system 15 comprises a medium-voltage MV output 29 connected to medium-voltage electrical loads 30. What disclosed so far for the loads 11 obviously also applies to the electrical loads 30, among which there are priority loads 31 and non-priority loads 32.

In these non-limiting cases, the electronic management and conversion system 15 further comprises:
- a first conversion device 18, which is capable of varying the DC electric voltage from the high voltage HV to a medium voltage MV and is connected to the high voltage input/output 16;
- a second conversion device 18, which is capable of varying the direct electric voltage from the medium voltage MV to the low voltage LV and is connected to the low voltage LV input/output 17;
- a first distribution unit 20 interposed between the first conversion device 18 and the second conversion device 18 and configured to power the medium-voltage MV electrical loads 30 of the road vehicle 1 selectively by means of the energy coming from the first storage system 6 (namely, from the first conversion device 18) or from the second conversion device 18;
- a second distribution unit 20 interposed between the second conversion device 18 and the low-voltage input/output 17 and configured to power the low-voltage LV electrical loads 11 of the road vehicle 1 selectively by means of the energy coming from the second conversion device 18 or from the second storage system 10;
- a control unit 21 configured to control both the first and the second conversion device 18 as well as the first and the second distribution unit 20 (and, if necessary, respective selection units 22 interposed between each distribution unit 20 and the respective electrical loads 11, 30).

In particular, not in a limiting manner, the control unit 21, in these embodiments, is configured to detect a malfunction (M) of the first storage system 6 and/or of the second storage system 10 and/or of at least one of the low-voltage LV or medium-voltage MV electrical loads 11, 30 and to control, depending on the malfunction M, the first conversion device 18 and/or the second conversion device 18 and the first distribution unit 20 and/or the second distribution unit 20 so as to ensure the supply of power to at least some priority loads 13, 31 among the low- and/or medium-voltage electrical loads 11, 30.

Advantageously, though not necessarily, the low voltage LV is equal to or smaller than 48 V, in particular equal to 12 V.

Advantageously, though not necessarily, the high voltage HV is equal to or greater than 48 V, in particular equal to 48 V, 400 V or 800 V.

Hereinafter, some operating scenarios will be described by mere way of example and, therefore, they should not be considered as limiting for the invention.

The non-limiting embodiment of FIG. 2 shows an electrical system 7 of the road vehicle 1 comprising an electronic management and conversion system 15, wherein the control unit 21 does not detect any malfunction M. In particular, all disconnecting devices 23 are closed and allow the loads 11 to be powered by the distribution unit 20, in detail both by the low-voltage storage system 10 and by the high-voltage storage system 6 (said high voltage being converted by means of the conversion device 18).

In this case, for example, the high voltage is 800 V, 400 V or 48 V and the low voltage is 12 V, but, as already pointed out before, different voltage values can obviously be possible.

Figure 3:
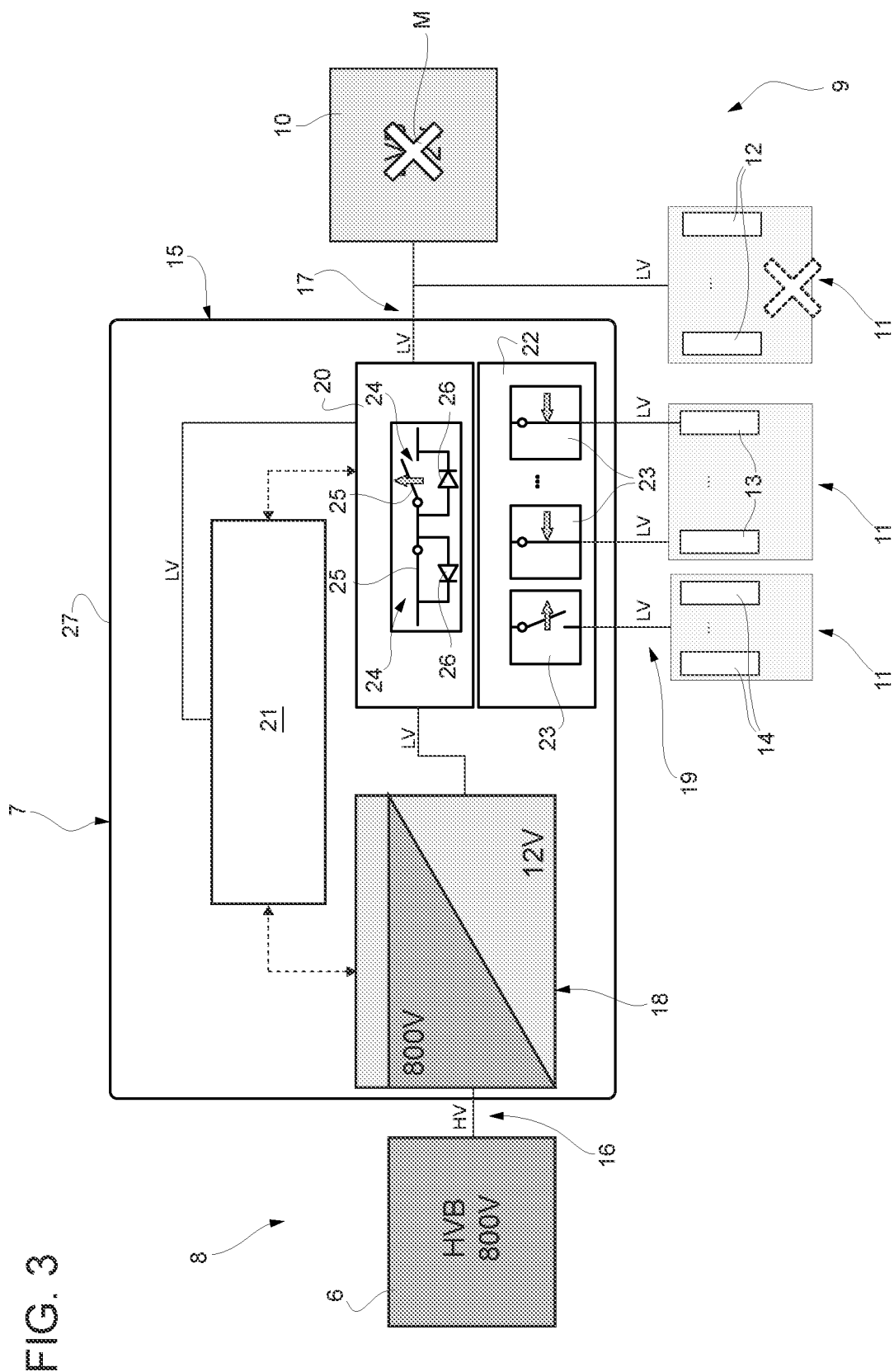
FIGS. 3 to 5 are schematic views of the system of FIG. 2 in different error configurations.

The non-limiting embodiment of FIG. 3 shows a first scenario, in which the low-voltage storage system 10 suffers from a malfunction M (schematically shown by the X symbol with a continuous line). This malfunction causes the loss of supply of power to the continuous electrical loads 12 (for example, of the kind described above and indicated with the X symbol with a broken line). In detecting the malfunction M, the control unit 21 controls the distribution unit 20 so as to open the selector 24 connected to the storage system in order to disconnect the storage system 10 from the rest of the electrical system 7. At the same time, in order to make up for the lack of power supply by the storage system 10, the disconnecting device 23 connected to the non-priority loads 14 is controlled by the control unit 21 so as to open and disconnect the non-priority loads 14 (or at least part thereof), thus permitting the continuous supply of power to the priority loads 13, such as for example the electronic control units of the powertrain system 4, a possible system of active suspensions (in particular, one for each wheel 2, 3).

Figure 4:
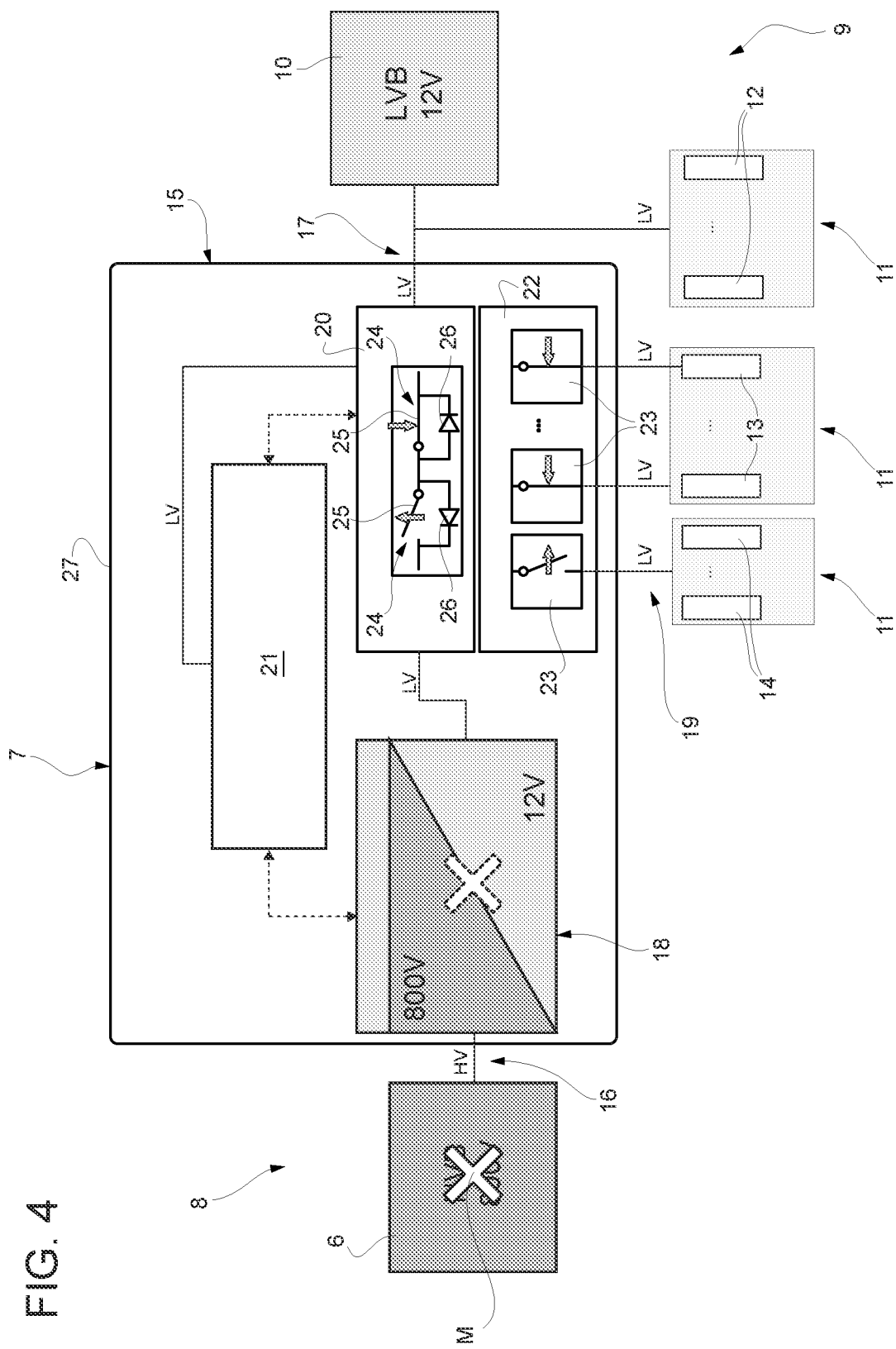

The non-limiting embodiment of FIG. 4 shows a second scenario, in which the high-voltage storage system 6 suffers from a malfunction M (schematically shown by the X symbol with a continuous line). This malfunction causes the loss of power supply and, hence, of operation of the conversion device 18 (indicated with the X symbol with a broken line). In detecting the malfunction M, the control unit 21 controls the distribution unit 20 so as to open the selector 24 connected to the storage system 6 (namely, to the conversion device 18) in order to disconnect the storage system 6 from the rest of the electrical system 7. At the same time, in order to make up for the lack of power supply by the storage system 6, the disconnecting device 23 connected to the non-priority loads 14 is controlled by the control unit 21 so as to open and disconnect the non-priority loads 14 (or at least part thereof), thus permitting the continuous supply of power to the priority loads 13, such as for example the electronic control units of the powertrain system 4. Therefore, the storage system 10 is sized so as to be sufficient for the supply of power to the priority loads 13, for example of the kind described above.

In particular, according to the prior art, in case there is a malfunction M of the low-voltage circuit 9, the entire road vehicle 1 is prevented from being powered (especially in case of an entirely electric vehicle), thus losing all the drive. On the contrary, the system 7 allows for the disconnection of the superfluous loads (namely, the non-priority loads 14), such as radio, air conditioning or navigator, but it still supplies the power needed to activate a part, even a small one, of the powertrain system 4. In other words, the electrical system 7 powers, regardless of the malfunction M, at least a coast-down of the road vehicle 1, thus ensuring the safety of the vehicle 1 and of the passengers.

In the non-limiting embodiments of the accompanying figures, continuous lines indicate power connections, namely relating to the supply of power to the components of the electrical system 7, whereas broken lines indicate logic connections.

Figure 5:
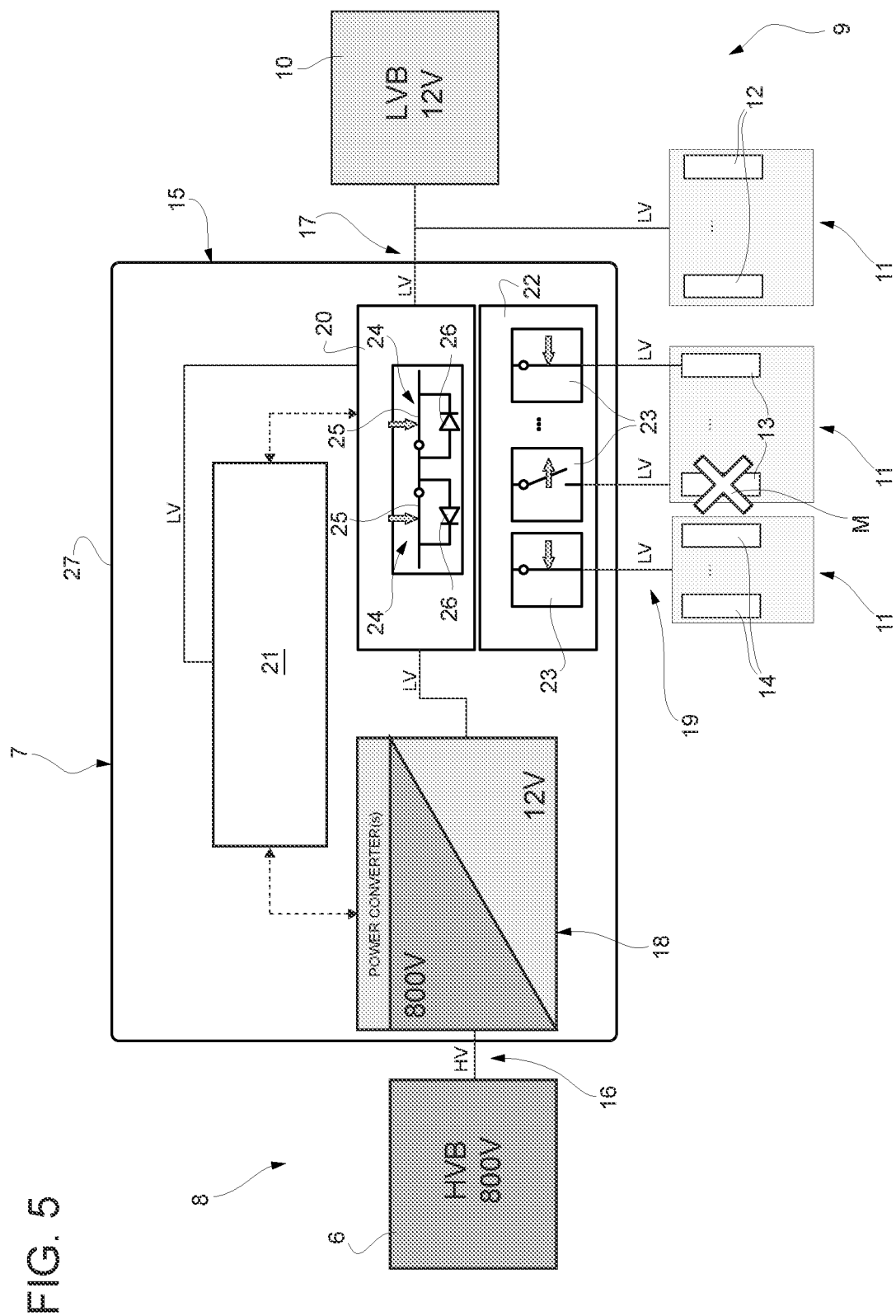
Figure 6:
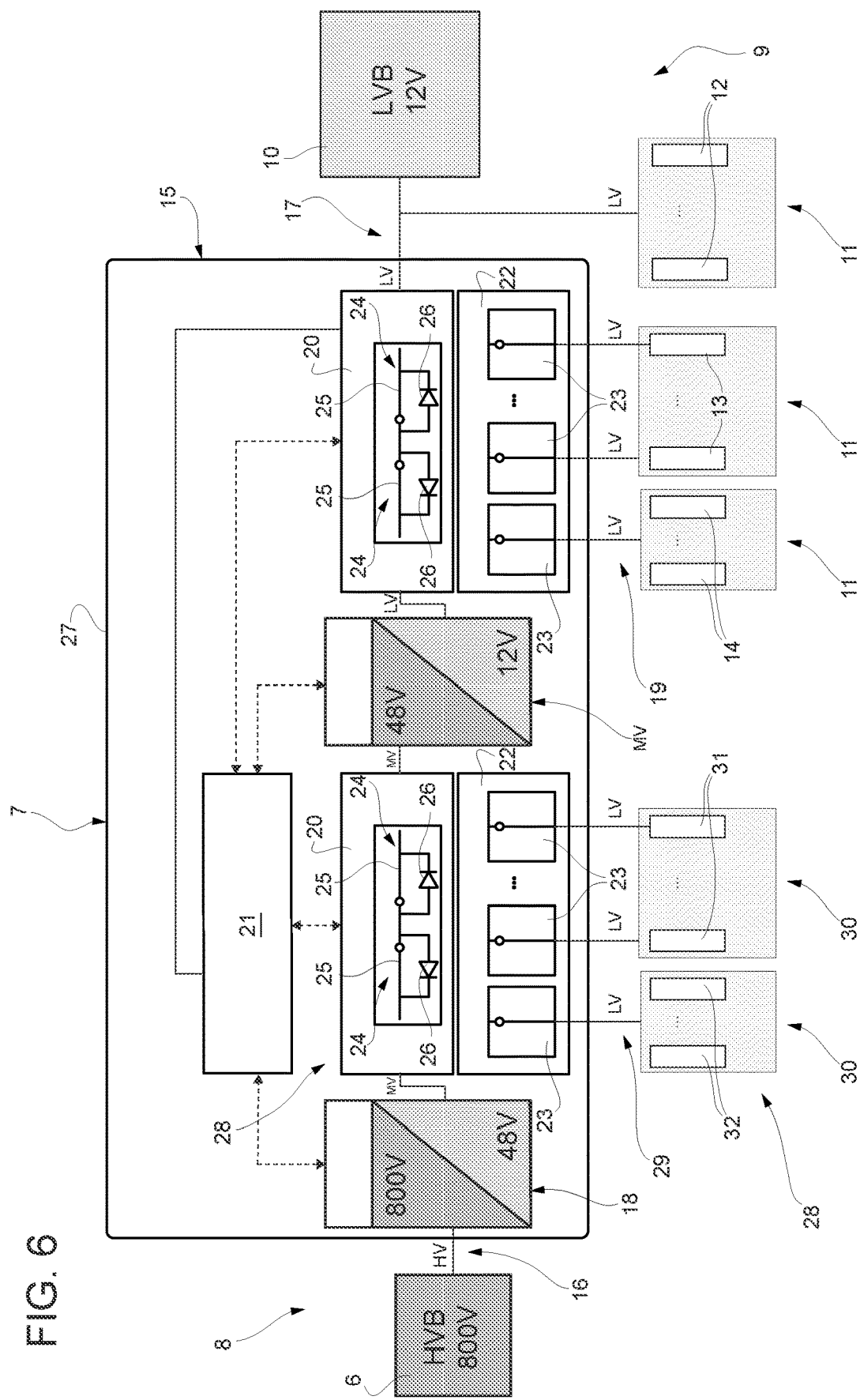
FIG. 6 is a schematic view of a second embodiment of the electrical system of the road vehicle of FIG. 1, which is manufactured according to the invention and is in an operating configuration.
Figure 7:
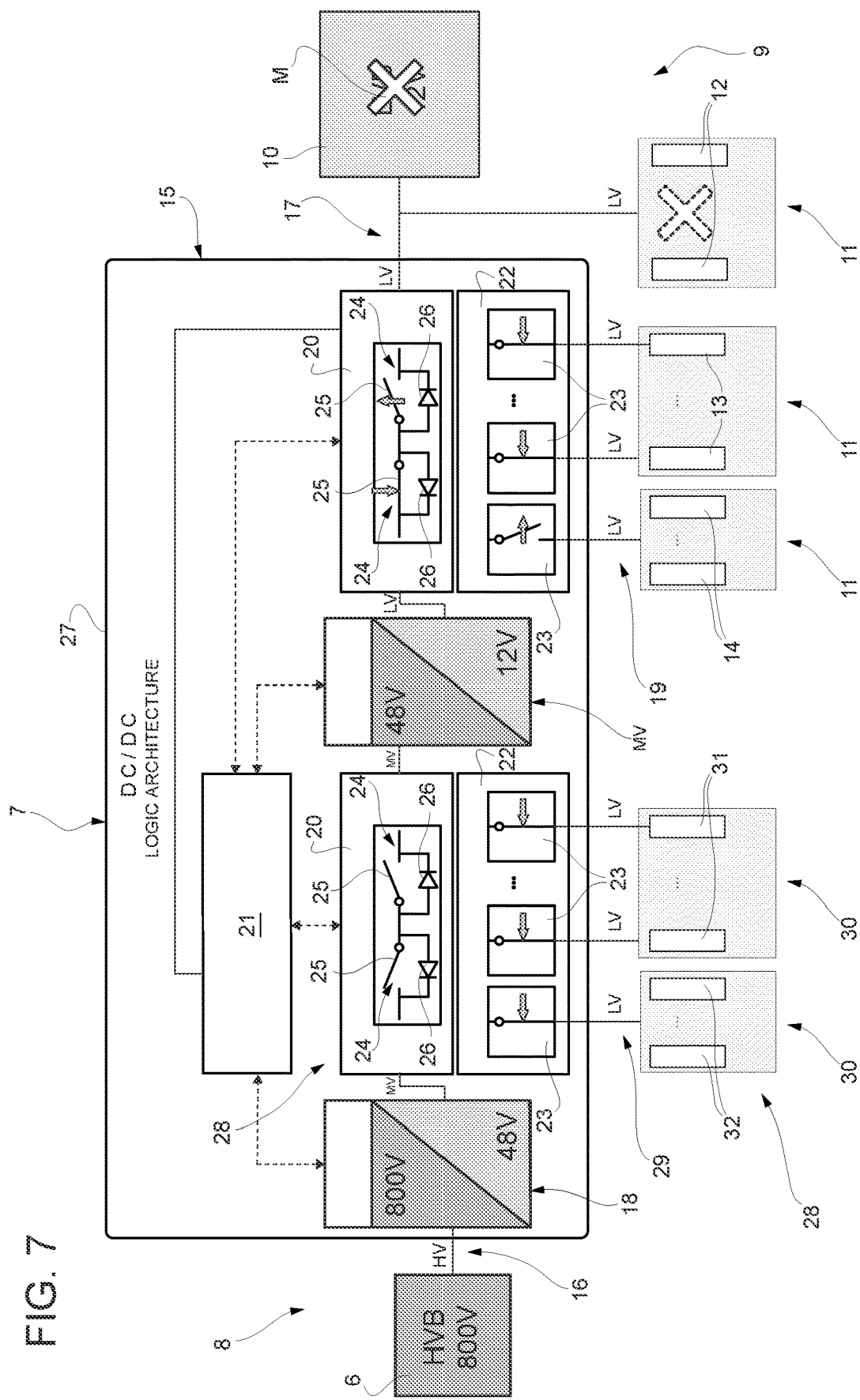
FIGS. 7 to 9 are schematic views of the system of FIG. 6 in different error configurations.

The non-limiting embodiment of FIG. 5 shows a third scenario, in which one of the electrical loads 11 suffers from a malfunction M (schematically shown by the X symbol with a continuous line). In detecting the malfunction M, the control unit 21 controls the distribution unit 20 so as to keep the selectors 24 closed and connected to the respective storage systems 6 and 10, but, at the same time, the disconnecting device 23 connected to the malfunctioning load 11 is controlled by the control unit 21 so as to open and disconnect the malfunctioning load 11 from the rest of the electrical system 7. In this way, a chain of malfunctions is avoided. Regardless of the type of malfunctioning electrical load 11, the supply of power to the other working loads 11 is ensured, thus guaranteeing, at least, the safety of the road vehicle 1, for example by suggesting the driver to pull over or by warning him/her of a degraded operating mode of the powertrain system 4.

The non-limiting embodiments of FIGS. 6 to 9 show the same scenarios as FIGS. 2 to 5 in an electronic management and conversion system 15 also provided with the medium-voltage circuit 28, namely whose inner structure consisting of the conversion device 18, of the distribution unit 20 and of the selection unit 22 is repeated in series.

In particular, in this case, the high voltage HV is, for example, 800 V or 400 V, the medium voltage MV is, for example, 48 V and the low voltage LV is, for example, 12 V.

For instance, not in a limiting manner, the priority electrical loads 31 are the active suspension systems of the road vehicle 1 and the priority loads 13 are the braking or driving systems of the road vehicle 1.

Figure 8:
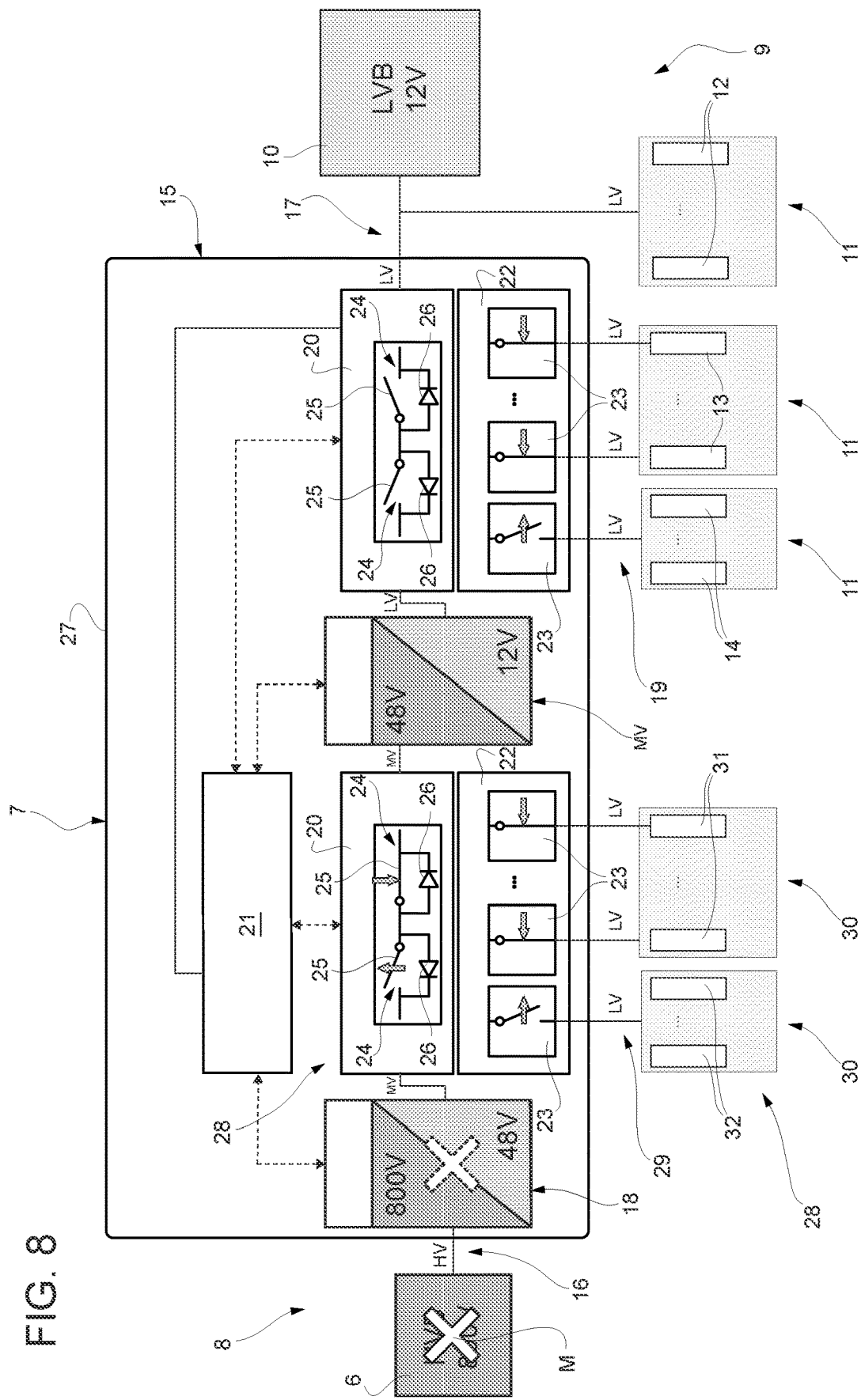
Figure 9:
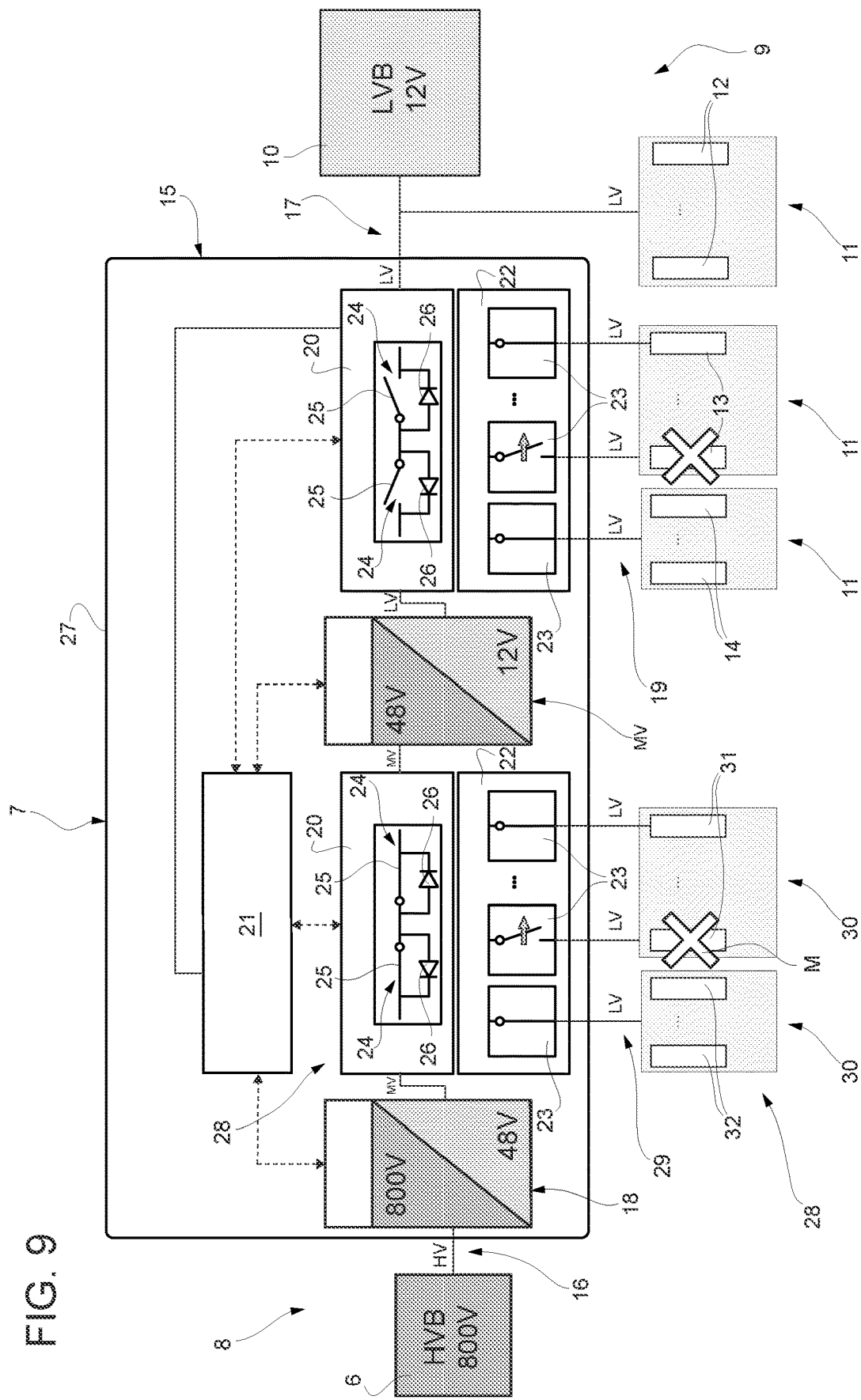
Figure 10:
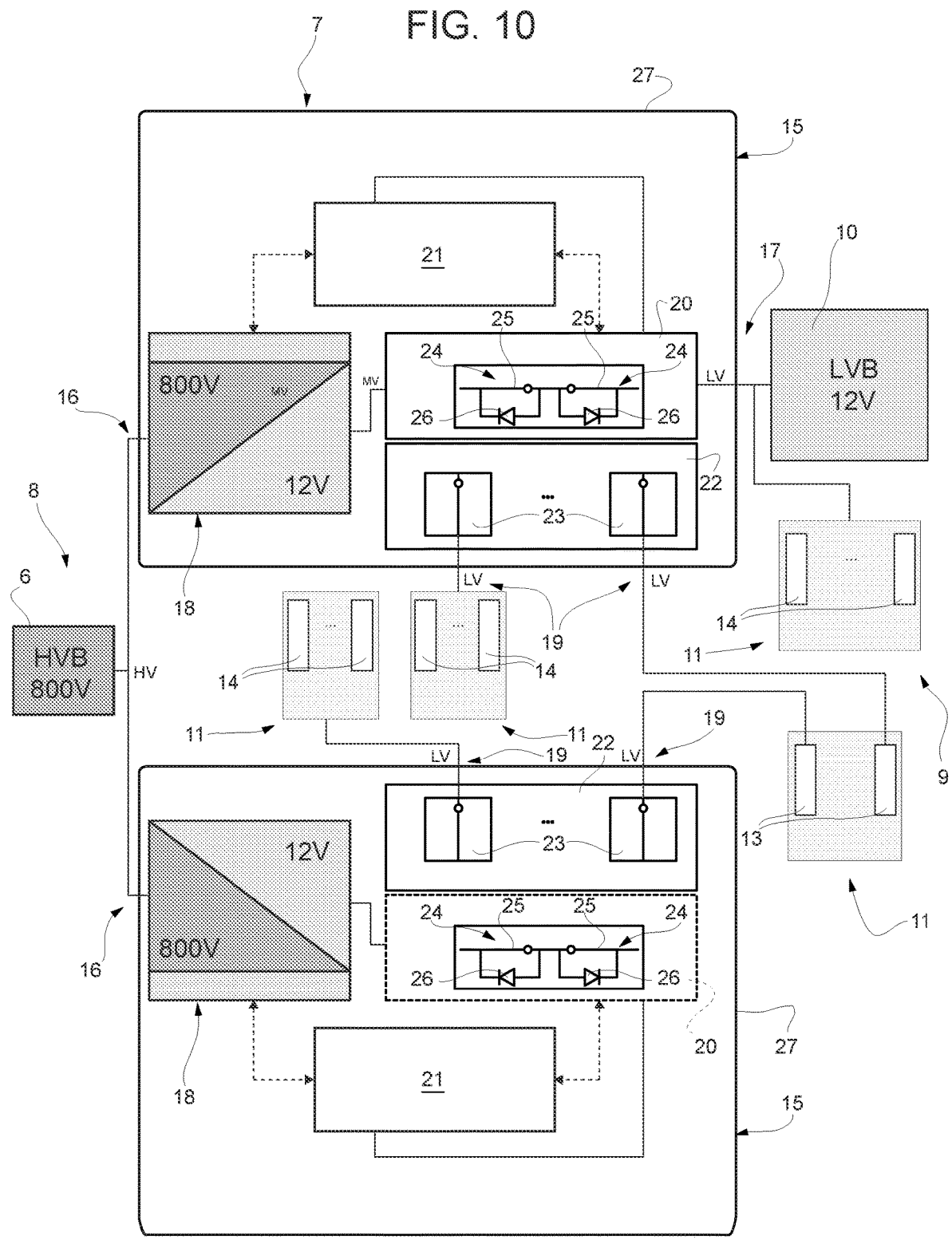
FIG. 10 is a schematic view of a third embodiment of the electrical system of the road vehicle of FIG. 1, which is manufactured according to the invention and is in an operating configuration.
Figure 11:
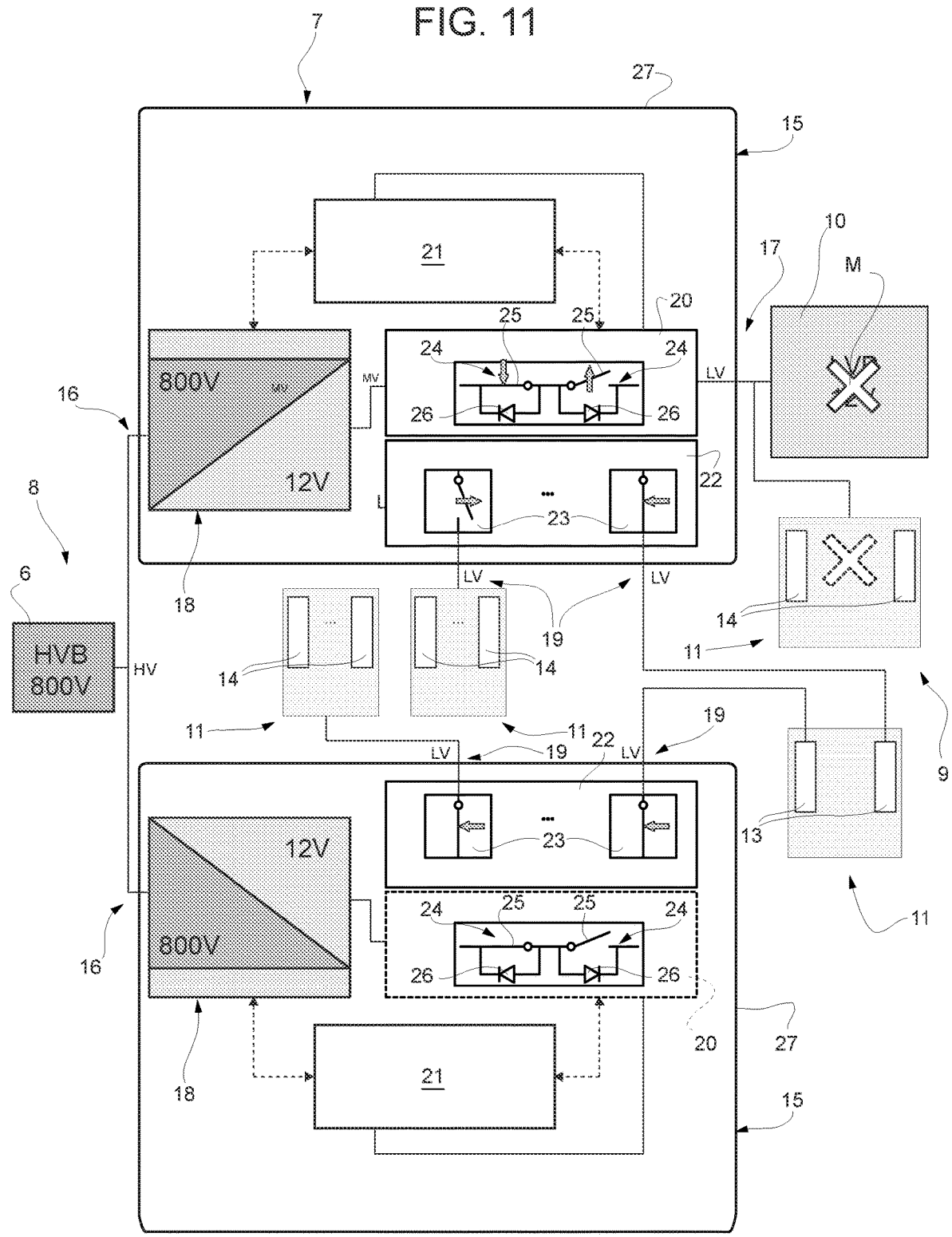
FIGS. 11 to 13 are schematic views of the system of FIG. 10 in different error configurations.
Figure 12:
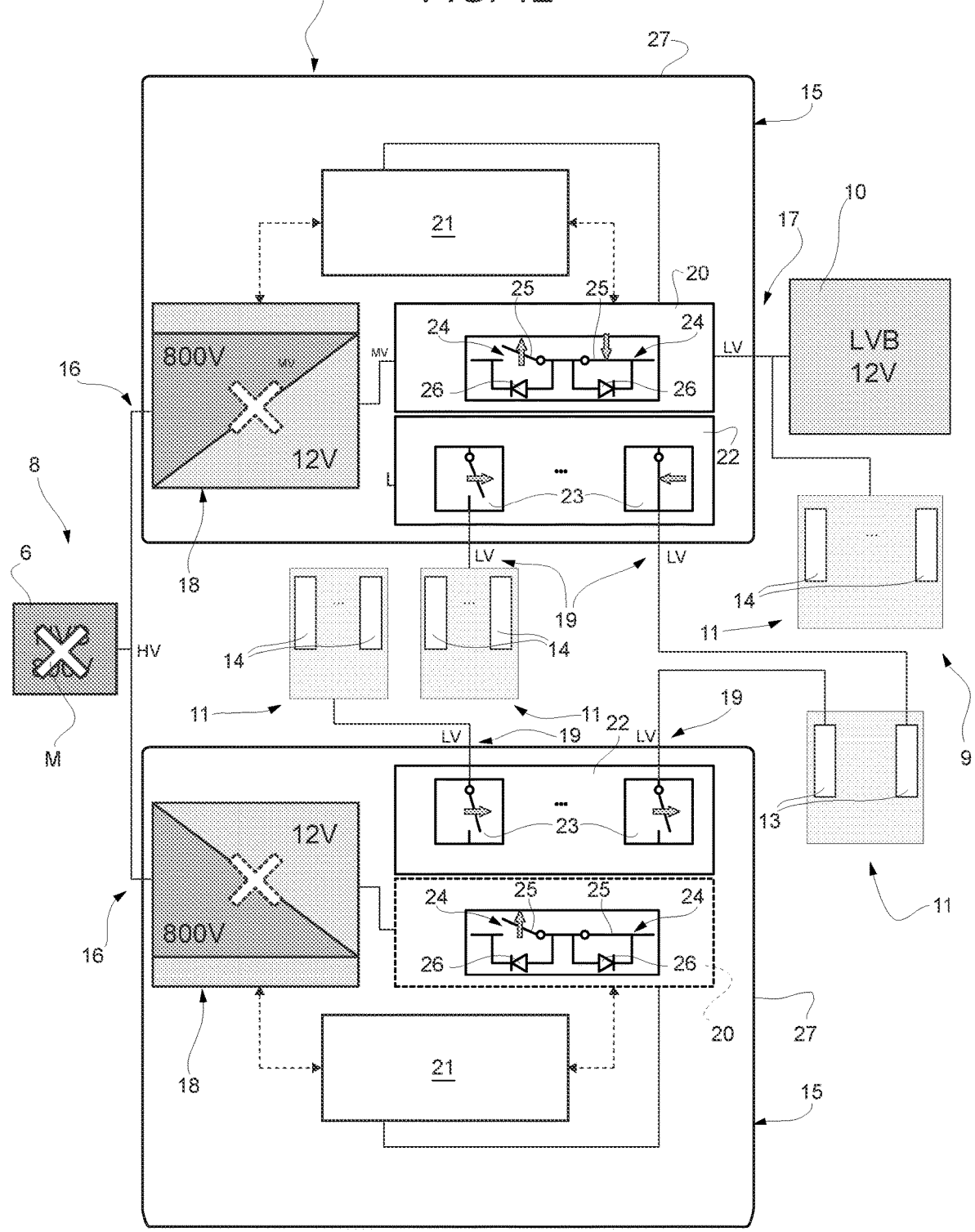
Figure 13:
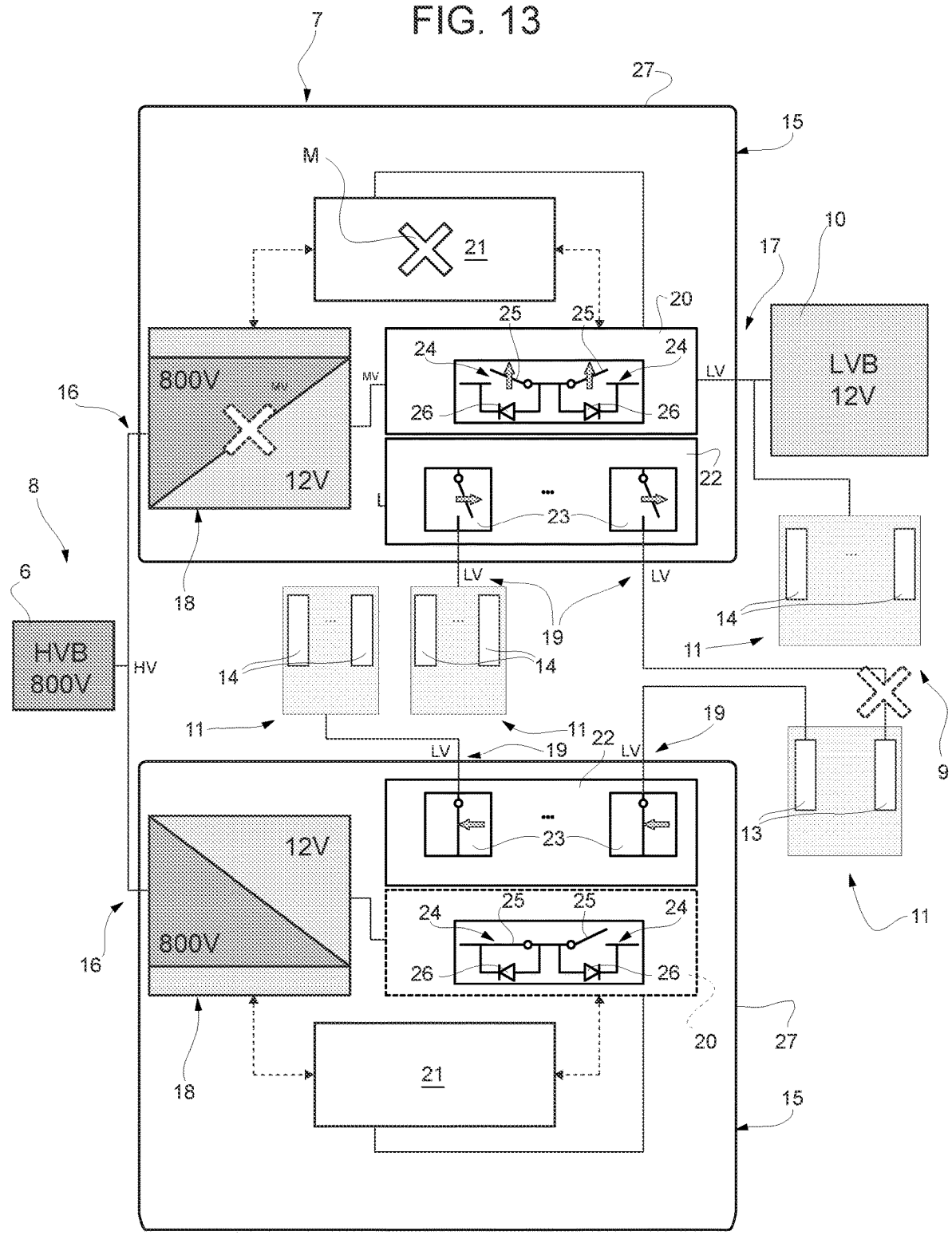

In these cases, as shown in the second scenario of FIG. 8, the electrical loads 30 are anyway powered by the second storage system 10 by means of the second conversion device 20, which operates in boost mode converting the low voltage supplied by the storage system 10 into medium voltage in order to power at least the medium-voltage priority loads 31. On the contrary, not in a limiting manner, in the first scenario of FIG. 7, both conversion devices 18 operate in buck mode converting the high voltage HV supplied by the storage system 6, at first, into medium voltage MV for the loads 30, in particular 31, and subsequently into low voltage LV for the loads 11, in particular 13.

The non-limiting embodiments of FIGS. 10 to 13 show the same scenarios as FIGS. 2 to 5 and FIGS. 6 to 9 in an electrical system 7 comprising two management and conversion systems 15, namely in parallel.

In particular, in this case, the high voltage HV is, for example, 800 V or 400 V and the low voltage LV is, for example, 12 V.

For example, generally speaking, the priority loads 13 comprise the steering system of the front wheels 2, in case it is completely electrically operated and, therefore, can jeopardize the functionality and the safety of the road vehicle 1.

In these cases, in the first two scenarios, the control units 21 control the devices 18 and/or the units 20 and 22 according to what described above. In addition, this embodiment also is capable of making up for the possible malfunction M of one of the control units 21 (see FIG. 13), which causes the disconnection of the relative device 18 and of the units 20 and 22. In this case, the priority loads 11 are powered by the action of the correctly working control unit 21, which controls the respective conversion device 18, the distribution units 20 and the selection units 22 so as to correctly supply power to all possible loads 11.

In particular, in case there is a malfunction of a control unit 21, the direct connection of the continuous loads 12 to the storage systems 6 allows them to be powered.

These non-limiting embodiments show the presence of a control unit 21 for each management and conversion system 15; however, the distribution units 20 can be fewer than the systems 15. As a matter of fact, in the non-limiting embodiments of FIGS. 10 to 13, the distribution unit 20 of the bottom system 15 is optional (since it is exclusively connected to the high-voltage storage system 6).

Even though the invention described above relates to a specific embodiment, it should not be considered as limited to said embodiment, for its scope of protection also includes all those variants, changes or simplifications covered by the appended claims, such as, for instance, a different type priority or non-priority loads, a different quantity of systems 15 or devices 18, different values of high, medium or low voltage, etcetera.

The embodiments described herein can be combined with one another, without for this reason going beyond the scope of protection of the invention.

The system and the vehicle described above have many advantages.

First of all, they significantly reduce the size and the weight of the electrical system of the road vehicle 1, eliminating the need for local storage devices. In particular, these effects are particularly important in high-performance vehicles, for example for racing on a track.

In addition, the complexity of the electrical system is simplified, for the necessary redundancy and safety are ensured by the electronic management and conversion system and by the possible presence of a plurality of conversion devices.

Furthermore, thanks to the sufficient sizing of the storage system 10, the electrical system 7 described above is capable of ensuring the supply of power to the priority loads concerning the vehicle powertrain, the suspensions and the steering system, anyway without stressing the conversion devices (namely, without having the conversion devices continuously operate).

A further advantage of the invention lies in the fact that it provides an integrated and scalable system, wherein "scalable" means that, depending on the power requested by a given load, it is possible to install different types of power converters having different conversion ratios, so as to eliminate the need for local converters and, if necessary, allow for the addition of suitable converters based on the optionals and on the features of the road vehicle model. For example, if the vehicle has active suspensions, a converter, for instance 800V/48V, can easily be integrated in order to directly supply the correct voltage for that specific device.

Finally, the electrical system 7 described above features relatively reduced costs and a relatively small complexity, since it consist of commercial components.

LIST OF THE REFERENCE NUMBERS OF THE FIGURES 1 vehicle
2 front wheels
3 rear wheels
4 powertrain system
5 electric machine
6 first storage system
7 electrical system
8 high-voltage electric circuit
9 low-voltage electric circuit
10 storage system
11 electrical loads
12 continuous electrical loads
13 priority electrical loads
14 non-priority electrical loads
15 electronic management and conversion system
16 high-voltage input/output
17 low-voltage input/output
18 conversion device
19 low-voltage output
20 distribution unit
21 control unit
22 selection unit
23 disconnecting devices
24 selectors
25 switch
26 diode
27 enclosure
28 medium-voltage circuit
29 medium-voltage output
30 electrical loads
31 priority electrical loads
32 non-priority electrical loads
HV high voltage
LV low voltage
M malfunction
MV medium voltage

The invention claimed is:

1. An electrical system of a road vehicle; the electrical system comprising:
a high-voltage electric circuit provided with a first power storage system and at least one electric machine for an electric or hybrid powertrain system;
a medium-voltage (MV) electric circuit;
a low-voltage electric circuit provided with a second power storage system and a plurality of low-voltage electrical loads; and
a first electronic management and conversion system that connects the low-voltage electric circuit, the medium-voltage electric circuit, and the high-voltage electric circuit to each other to selectively transfer electrical energy from the high-voltage (HV) electric circuit to the medium-voltage electric circuit, and from the medium-voltage electric circuit to the low-voltage electric circuit or vice versa; and at least one additional electronic management and conversion system connected in parallel to the first electronic management and conversion system;

wherein the first electronic management and conversion system comprises:
- a high voltage input/output connected to the first power storage system;
- a medium voltage output connected to medium voltage electrical loads of the medium-voltage electric circuit;
- a low voltage input/output connected to the second power storage system and to the plurality of low-voltage electrical loads;
- a first conversion device that is capable of varying the DC electric voltage from high voltage to medium voltage and is connected to the high voltage input/output;
- a second conversion device that is capable of varying the DC electric voltage from medium voltage to low voltage and is connected to the low-voltage input/output;
- a first distribution unit, interposed between the first conversion device and the second conversion device, and configured to power medium voltage electrical loads of the road vehicle selectively by energy from the first storage system or the second conversion device;
- a second distribution unit, interposed between the second conversion device and the low-voltage input/output, and configured to power the low-voltage electrical loads of the road vehicle selectively by energy from the second version device or the second storage system; and
- a control unit configured to control the first and second conversion devices and the first and second distribution units;

the control unit being configured to detect a malfunction of the first storage system and/or the second storage system and/or at least one of the low- or medium-voltage electrical loads and to control, depending on the malfunction, the first and second conversion devices and the first or second distribution units to ensure power supply to at least some priority loads among the low-voltage and medium-voltage electrical loads.

2. The electrical system according to claim 1 comprising a selection unit, which is interposed between the loads and the distribution unit and is configured to selectively connect or disconnect certain loads according to the commands given by the control unit.

3. The electrical system according to claim 2, wherein, when the malfunction is related to one of the electrical loads, the control unit is configured to command the selection unit so as to disconnect the malfunctioning electrical load from the rest of the electrical system.

4. The electrical system according to claim 1, wherein the control unit is configured to disconnect the first storage system or the second storage system from the electrical loads when the malfunction is related to the first storage system or the second storage system, respectively, while always supplying power to at least the priority loads and disconnecting non-priority loads.

5. The electrical system according to claim 4, wherein the non-priority loads are those electrical loads related to comfort, optional or a combination of comfort and optional, while the priority loads are those electrical loads related to safety, performance or a combination of safety and performance of the road vehicle.

6. The electrical system according to claim 1, wherein each of the first and the at least one additional electronic management and conversion system comprises a conversion device connected to each other in parallel either in the high voltage input or to the distribution unit.

7. The electrical system according to claim 6, wherein the control unit is configured to estimate an electric power required by the electric loads and decides how many of the conversion devices to operate together according to the electric power required by the electric loads.

8. The electrical system according to claim 1, wherein the second storage system is sized to be capable of independently powering at least the priority loads.

9. The electrical system according to claim 1, wherein the conversion device is bidirectional.

10. The electrical plant according to claim 1, wherein the first electronic management and conversion system comprises a single outer protective enclosure internally housing at least the conversion device, the control unit, the distribution unit, and optionally the selection unit.

11. The electrical system according to claim 1, in which the low voltage is 48 V or less.

12. The electrical system according to claim 1, wherein the high voltage is equal to or greater than 48 V.

13. A road vehicle comprising:
four wheels, of which at least one pair of wheels is driven;
an electric or hybrid powertrain system; and
the electrical system according to claim 1.

* * * * *